United States Patent [19]

Elmis

[11] Patent Number: 4,506,297
[45] Date of Patent: Mar. 19, 1985

[54] INTEGRATED CIRCUIT FOR TELEVISION RECEIVERS COMPRISING A SONIC SEPARATOR WITH A CLAMPING CIRCUIT

[75] Inventor: Herbert Elmis, Denzlingen, Fed. Rep. of Germany

[73] Assignee: ITT Industries, Inc., New York, N.Y.

[21] Appl. No.: 391,623

[22] Filed: Jun. 24, 1982

[30] Foreign Application Priority Data

Jul. 11, 1981 [EP] European Pat. Off. ....... 81 105411.3

[51] Int. Cl.³ .................. H04N 5/08; H04N 5/10; H04N 7/00
[52] U.S. Cl. .................. 358/153; 358/154; 358/158; 328/139
[58] Field of Search .............. 358/153, 158, 154; 328/139; 307/358

[56] References Cited

U.S. PATENT DOCUMENTS

| | | | |
|---|---|---|---|
| 3,237,110 | 2/1966 | Kaye | 328/139 |
| 4,081,833 | 3/1978 | Akiyama | 358/153 |
| 4,385,319 | 5/1983 | Hasegawa | 358/153 |

*Primary Examiner*—John C. Martin
*Assistant Examiner*—John K. Peng
*Attorney, Agent, or Firm*—Donald J. Lenkszus

[57] ABSTRACT

To prevent the separation-level shift occurring in the clamping circuit during the transmitted vertical synchronizing pulses or during prolonged interference pulses, a pulse opening an electronic switch (S) inserted between the clamping circuit and one RC section thereof is generated by means of a coincidence stage (KO), a gate circuit (TS), an inverter (I), and an AND gate (U). The clamping circuit is thus unblocked only during the horizontal synchronizing pulses, so that no shift of the separation level can occur during the vertical synchronizing pulses or during any interference pulses in the composite color signal (F).

3 Claims, 3 Drawing Figures

INTEGRATED CIRCUIT FOR TELEVISION RECEIVERS COMPRISING A SONIC SEPARATOR WITH A CLAMPING CIRCUIT

BACKGROUND OF THE INVENTION

The present invention relates to an integrated circuit for television receivers comprising a sync separator with a clamping circuit which makes the relative separation level for the synchronizing signal independent of the amplitude of the latter. The separation level and the porch are integrated by means of a first and a second RC section of the kind set forth in the preamble of the claim. The integrated circuit further includes a coincidence stage, the voltage-controlled horizontal oscillator, the phase comparator for the horizontal oscillator and horizontal synchronizing signals, a gate circuit, a vertical-synchronizing-pulse integrator, and the vertical oscillator; for further details of these subcircuits, see the preamble of the claim. An integrated circuit of this kind is known under the designations TDA 1950 and TDA 1950 F described in the 1981 data book "Integrierte Schaltungen fur Rundfunk- und Fernsehempfanger", ITT-Intermetall, Freiburg, Edition 1981/6, pages 100 to 103. Further details of the coincidence stage and the gate circuit are also given in the journal "Elektronik aktuell", 1976, No. 2, pages 7 to 14, in connection with the integrated circuits TDA 9400 and TDA 9500. Both publications originate from the Applicants.

In the case of the prior art clamping circuit with two series RC sections and an interconnecting resistor, the switching level is the same for all horizontal synchronizing pulses because the charging current and the discharge current of the capacitor C1 are in equilibrium. The time constant of this RC section is chosen so that during amplitude variations of the composite color signal or during DC level variations caused e.g., by power-line hum in the composite color signal, the separation level remains constant in relation to the peak value. This time constant is generally shorter than 20 ms.

However, this circuit has the disadvantage that during the vertical synchronizing pulses contained in the composite color signal, the separation level shifts in such a way that the separation level for the subsequent horizontal synchronizing pulses of the next line is greater than that in the normal case described. Because of the finite rise time of the horizontal synchronizing pulses, the separated horizontal synchronizing pulses appearing at the output of the sync separator are slightly shifted in phase, so that at the beginning of each picture, the horizontal synchronization shows a slight phase error.

Another disadvantage of the prior art circuit lies in the fact that the separation level may be shifted by wide interference pulses to the point that the subsequent horizontal synchronizing pulses cannot be separated for a certain time.

SUMMARY OF THE INVENTION

The invention as claimed is intended to remedy this drawback. Its object is to modify the prior art integrated circuit so as to eliminate or substantially avoid the aforementioned phase errors and subsceptibility to interference. The advantage of the invention thus lies directly in the solution of the problem; there is no shift in the sync pulse separation level during the picture change, and the pulse separation is unaffected even by long interference pulses or strong ghost signals.

Other objects, features and advantages of the present invention will become more fully apparent from the following detailed description of the preferred embodiment, the appended claims and the accompanying drawings in which:

BRIEF DESCRIPTION OF THE DRAWINGS

The invention will now be explained in more detail with reference to the accompanying drawings, in which.

DETAILED DESCRIPTION OF THE INVENTION

Figure 1:
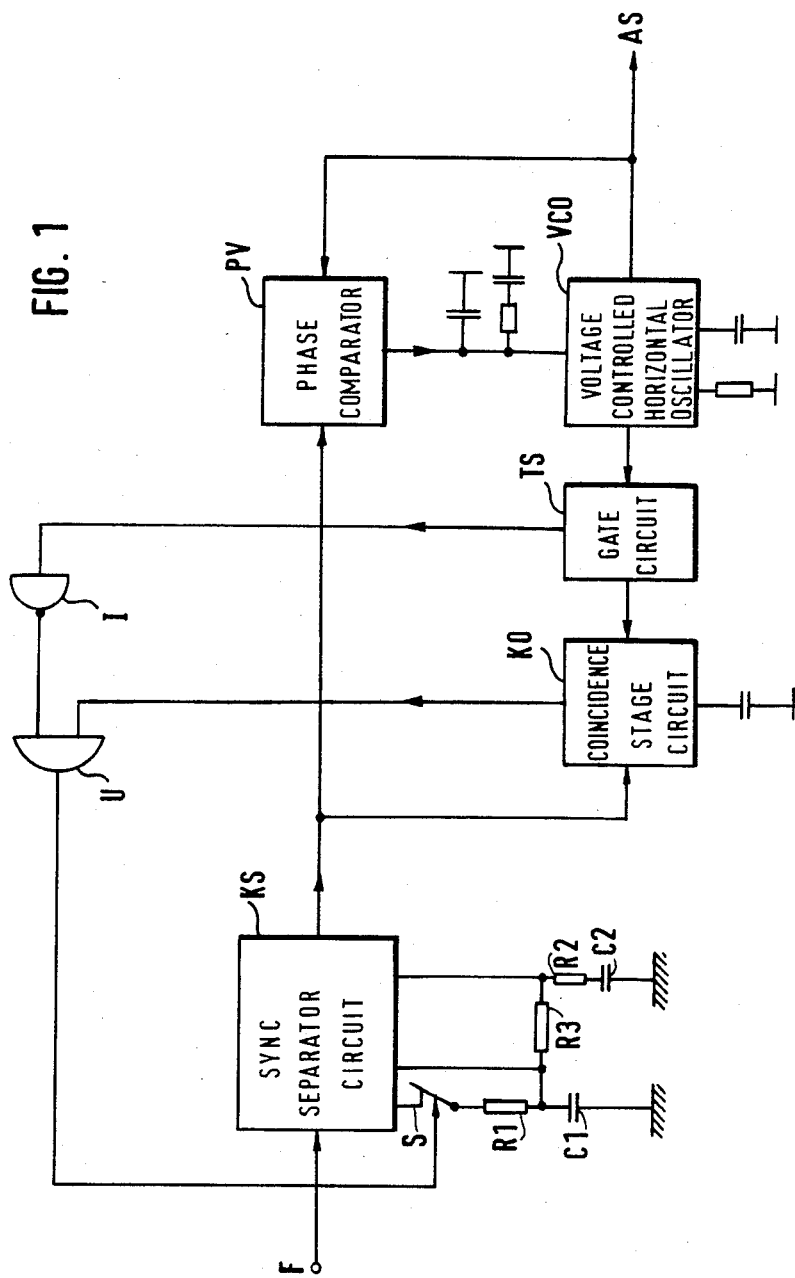
FIG. 1 is a block diagram of an embodiment of the first variant of the solution according to the invention.

Referring to FIG. 1, the block diagram of the first variant of the solution shows the voltage-controlled horizontal oscillator VCO, which is maintained at a constant frequency and phase by the phase comparator PV, which is fed with the output signals of the horizontal oscillator VCO and the horizontal synchronizing signal from the sync separator KS. The horizontal oscillator VCO also controls the gate circuit TS, which, in the synchronous mode, produces output pulses which are at least equal in duration to, i.e., just cover, the transmitted horizontal synchronizing pulses of one line, as in the known prior art described in the above-mentioned journal "Elektronik aktuell". In the prior art arrangement, the gate circuit TS serves to suppress interference pulses during the horizontal sweep. In the invention, the output signals of the gate circuit TS are inverted by the inverter I and applied to one input of the AND gate U.

The embodiment of FIG. 1 also shows the coincidence stage KO, one of whose various functions described in the above-mentioned journal is utilized in the invention, namely that which relates to the delivery of two different signal levels for the synchronous mode and the asynchronous mode, respectively. This output signal is applied to the second input of the AND gate U, whose output controls the electronic switch S. Via the latter, the resistor R1 of the first series RC section R1, C1 is connected to the sync separator KS. The polarities of the digital signals are chosen so that during the transmitted vertical synchronizing pulses, the switch S is closed only during the horizontal-frequency gate pulses, so that the RC section R1, C1 is disconnected from the sync separator KS during the remaining time. Thus, the clamping circuit is unblocked only during the horizontal synchronizing pulses, so that the separation level developed across the capacitor C1 cannot be changed by the transmitted vertical synchronizing pulses or by any other interference, particularly during the horizontal sweep.

As the horizontal-frequency output pulses of the gate circuit TS are useful only if the horizontal oscillator VCO is synchronous with the composite color signal F, the blocking of the clamping circuit is cancelled if the coincidence stage KO detects asynchronism by comparing the separated horizontal synchronizing pulses with the gate pulses.

The resistor-capacitor junction of the RC section R1, C1 is connected via the additional resistor R3 to that terminal of the resistor R2 of the second series RC section R2, C2 which is not coupled to the capacitor C2; this terminal is also connected to the clamping circuit of the sync separator KS. The above-mentioned junction of the RC section R1, C1 is also connected to the clamping circuit, as is shown in the first-mentioned reference.

Figure 2:
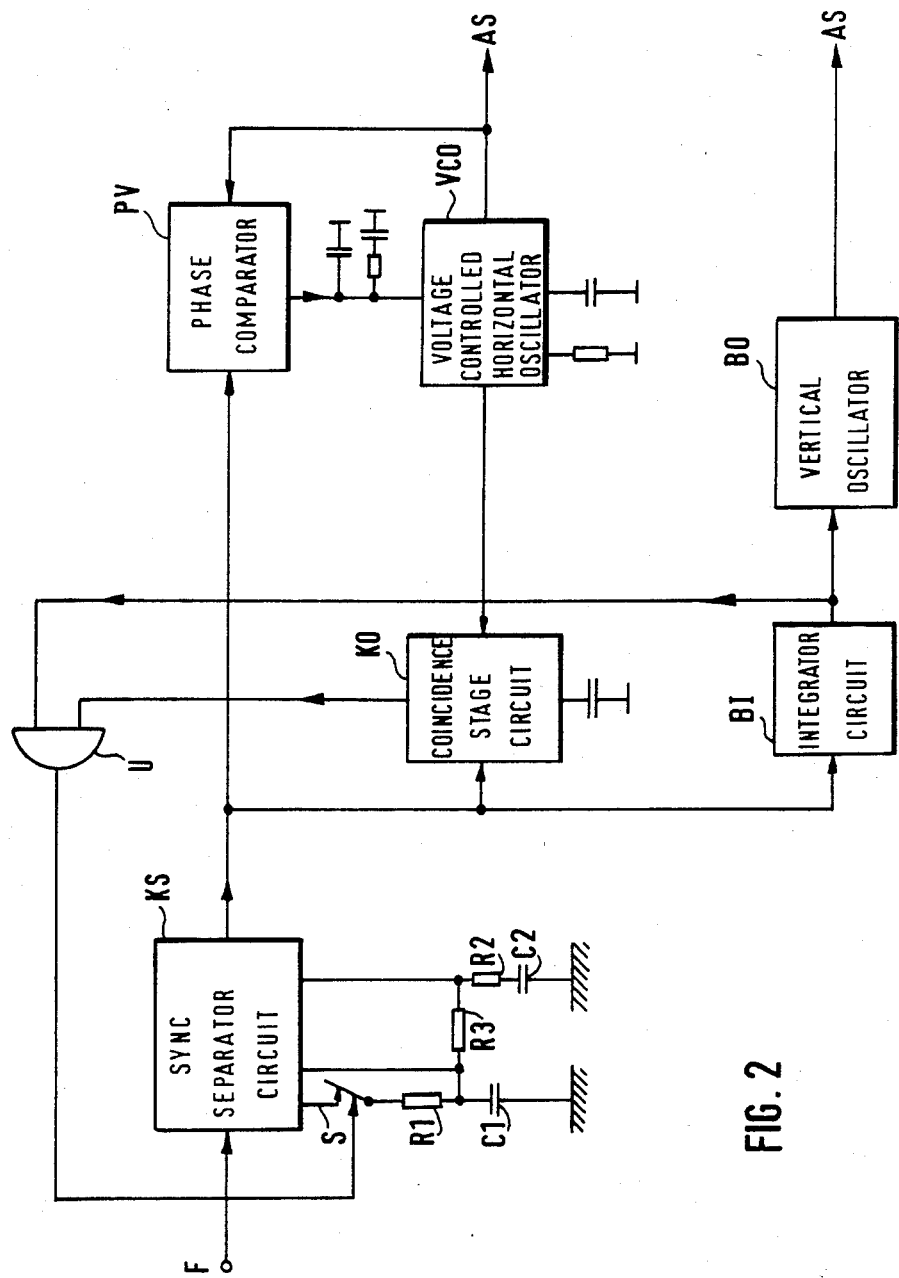
FIG. 2 is a block diagram of an embodiment of the second variant of the solution according to the invention.

FIG. 2 shows a simplification of the arrangement of FIG. 1 which eliminates the need for the gate circuit TS. Thus, if integrated circuits as set forth in the preamble of the claim are to be implemented without the gate circuit mentioned there, the output signal of the integrator BI for generating the internal vertical synchronizing pulses will be applied to that input of the AND gate U connected to the inverter I of FIG. 1. This input of the AND gate is thus fed with the processed vertical synchronizing pulses, which also synchronize the vertical oscillator BO.

Figure 3:
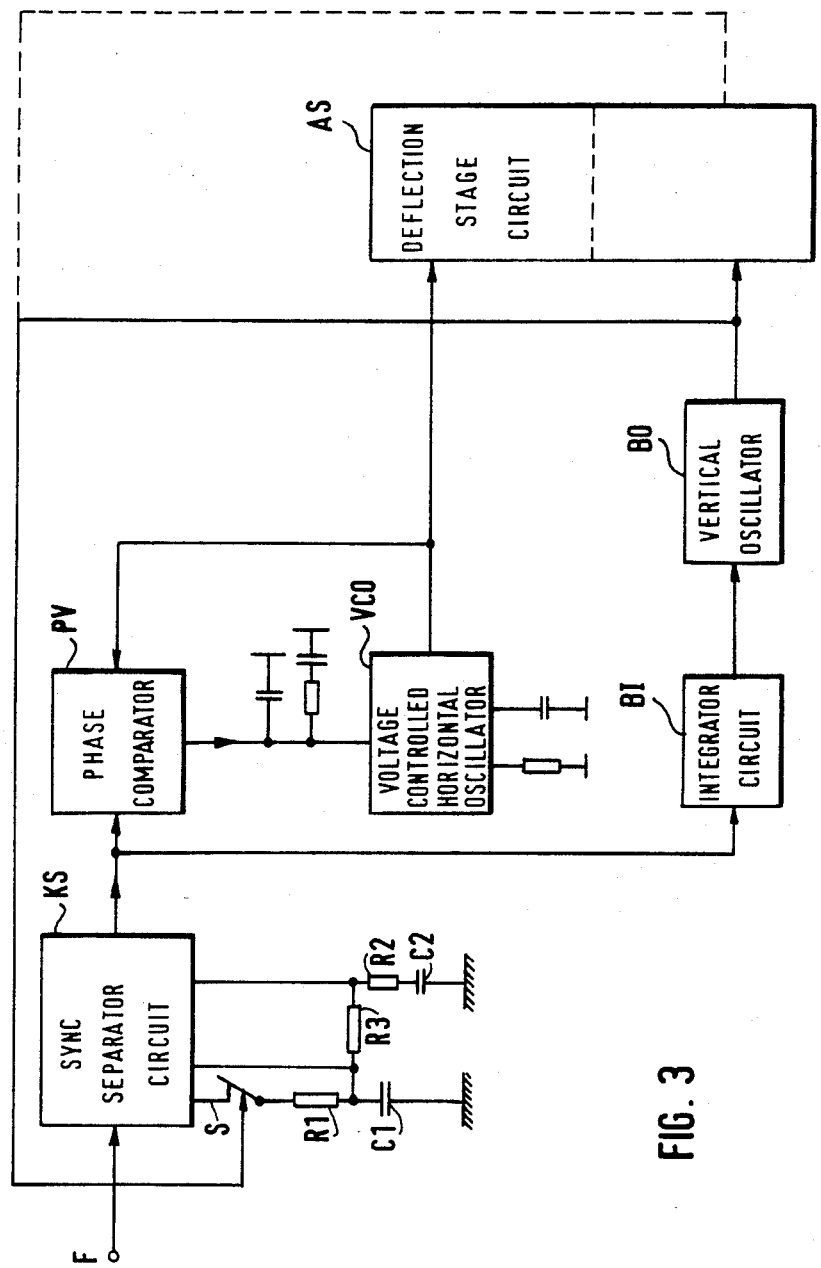
FIG. 3 is a block diagram of an embodiment of the third variant of the solution.

FIG. 3 shows another simplification which eliminates the need for the coincidence stage KO and the AND gate U. In this case, the switch S is controlled by the vertical retrace pulses direct. These pulses may be obtained from the output of the vertical oscillator BO or from the deflection stages AS. The latter possibility is indicated in FIG. 3 by the dashed connecting line.

While the present invention has been disclosed in connection with the preferred embodiment thereof, it should be understood that there may be other embodiments which fall within the spirit and scope of the invention as defined by the following claims.

I claim:

1. In a circuit for a television receiver having:
   a sync separator with a clamping circuit, said clamping circuit having first and second resistor-capacitor sections, the first resistor-capacitor section having a first resistor with first and second leads and a first capacitor with first and second leads, the second resistor-capacitor section having a second resistor with first and second leads and a second capacitor with first and second leads and a third resistor with first and second leads, said first leads of said capacitors being grounded, with said second lead of said first capacitor coupled to said first lead of said first resistor, said second lead of said second capacitor coupled to said first lead of said second resistor, said first lead of said third resistor coupled to said first lead of said first resistor and to said sync separator, said second lead of said third resistor coupled to said second lead of said second resistor and said sync separator,
   a coincidence circuit coupled to an output of said sync separator, for selectively providing first and second signal levels at an output thereof,
   a gate circuit for providing output pulses of a selected duration coupled to an input to said coincidence circuit,
   a voltage controlled horizontal oscillator coupled to said gate circuit,
   wherein the improvement comprises:
   an electronic switch with a control input said switch coupled between said second terminal of said first resistor and said sync separator; and
   an AND gate with an input coupled to an output of said coincidence stage circuit and an input coupled to an inverted output from said gate circuit with an output from said AND gate coupled to said control input of said electronic switch.

2. In a circuit for a television receiver having:
   a sync separator with a clamping circuit, said clamping circuit having first and second resistor-capacitor sections, the first resistor-capacitor section having a first resistor with first and second leads and a first capacitor with first and second leads, the second resistor-capacitor section having a second resistor with first and second leads and a second capacitor with first and second leads and a third resistor with first and second leads, said first leads of said capacitors being grounded, with said second lead of said first capacitor coupled to said first lead of said first resistor, said second lead of said second capacitor coupled to said first lead of said second resistor, said first lead of said third resistor coupled to said first lead of said first resistor and to said sync separator, said second lead of said third resistor coupled to said second lead of said second resistor and said sync separator,
   a coincidence circuit with an input coupled to an output of said sync separator, for selectively providing first and second signal levels at an output thereof,
   an integrator circuit with an input coupled to an output of said sync separator circuit;
   wherein the improvement comprises:
   an electronic switch with a control input, said switch coupled between said second terminal of said first resistor and said sync separator circuit; and
   an AND gate with an input coupled to an output of said coincidence stage circuit and an input coupled to an output from said integrator circuit with an output from said AND gate coupled to said control input of said electronic switch.

3. In a circuit for a television receiver having:
   a sync separator with a clamping circuit, said clamping circuit having first and second resistor-capacitor sections, the first resistor-capacitor section having a first resistor with first and second leads and a first capacitor with first and second leads, the second resistor-capacitor section having a second resistor with first and second leads and a second capacitor with first and second leads and a third resistor with first and second leads, said first leads of said capacitors being grounded, with said second lead of said first capacitor coupled to said first lead of said first resistor, said second lead of said second capacitor coupled to said first lead of said second resistor, said first lead of said third resistor coupled to said first lead of said first resistor and to said sync separator, said second lead of said third resistor coupled to said second lead of said second resistor and said sync separator,
   an integrator circuit with an input coupled to an output of said sync separator;
   a vertical oscillator with an input coupled to an output of said integrator circuit;
   a deflection stage circuit with an input coupled to an output of said vertical oscillator and;
   wherein the improvement comprises:
   an electronic switch with a control input, said switch coupled between said second terminal of said first resistor and said sync separator with said control input of said electronic switch coupled to an output of said deflection stage circuit.

* * * * *